June 24, 1930.    A. E. TRIPLETT    1,768,172
METHOD FOR COOKING FOOD
Original Filed April 3, 1929    3 Sheets-Sheet 1

A. E. Triplett
INVENTOR.
BY Lacey & Lacey
ATTORNEYS

June 24, 1930. A. E. TRIPLETT 1,768,172
METHOD FOR COOKING FOOD
Original Filed April 3, 1929 3 Sheets-Sheet 3

A. E. Triplett
INVENTOR.
BY Lacey & Lacey
ATTORNEYS

Patented June 24, 1930

1,768,172

UNITED STATES PATENT OFFICE

ARMSTEAD E. TRIPLETT, OF DALLAS, TEXAS

METHOD FOR COOKING FOOD

Original application filed April 3, 1929, Serial No. 352,257. Divided and this application filed September 12, 1929. Serial No. 392,130.

This invention relates to a method for cooking foods, and is a division of my application filed April 3, 1929, Serial No. 352,257.

The present invention is directed to a method for cooking foods wherein the foods may be cooked at various temperatures out of contact with the fuel gases and under a flowing pressure of preheated air, thereby releasing and carrying off all objectionable oils, gases and other by-products injurious to health.

Another object of the invention is to provide a method so that foods can be cooked at a low temperature, thereby preventing the destruction of valuable vitamins.

Another object of the invention is to provide a method wherein hams and meats of various kinds can be cooked under thorough and complete ventilation and pressure and the noxious and volatile bodies generated during the cooking process are released and carried off, preventing the food from having a strong flavor, objectionable odor and improving its keeping qualities. It is well known that foods throw off carbon dioxide, hydrogen sulphide and other volatile sulphur compounds, and it is another object of the method to automatically release these compounds and release the same by thorough and complete ventilation.

Another object of the invention is to provide a method whereby hams and other meats and foods are cooked at a predetermined temperature and at a predetermined pressure and flow of hot filtered air at a predetermined flow and pressure so as to have at all times a thorough and complete ventilation.

Another object of this invention is to provide a method whereby fresh meats, such as hams, etc., may be cured and smoked under predetermined heat, smoke, air, pressure and thorough ventilation throughout the smoking process, thereby reducing the shrinkage, improving the product and saving the drippings.

In the accompanying drawings:

Figure 5 is a detail sectional view showing the application of the plug.

Figure 6 is a sectional view on the line 6—6 of Figure 2.

Figure 1:
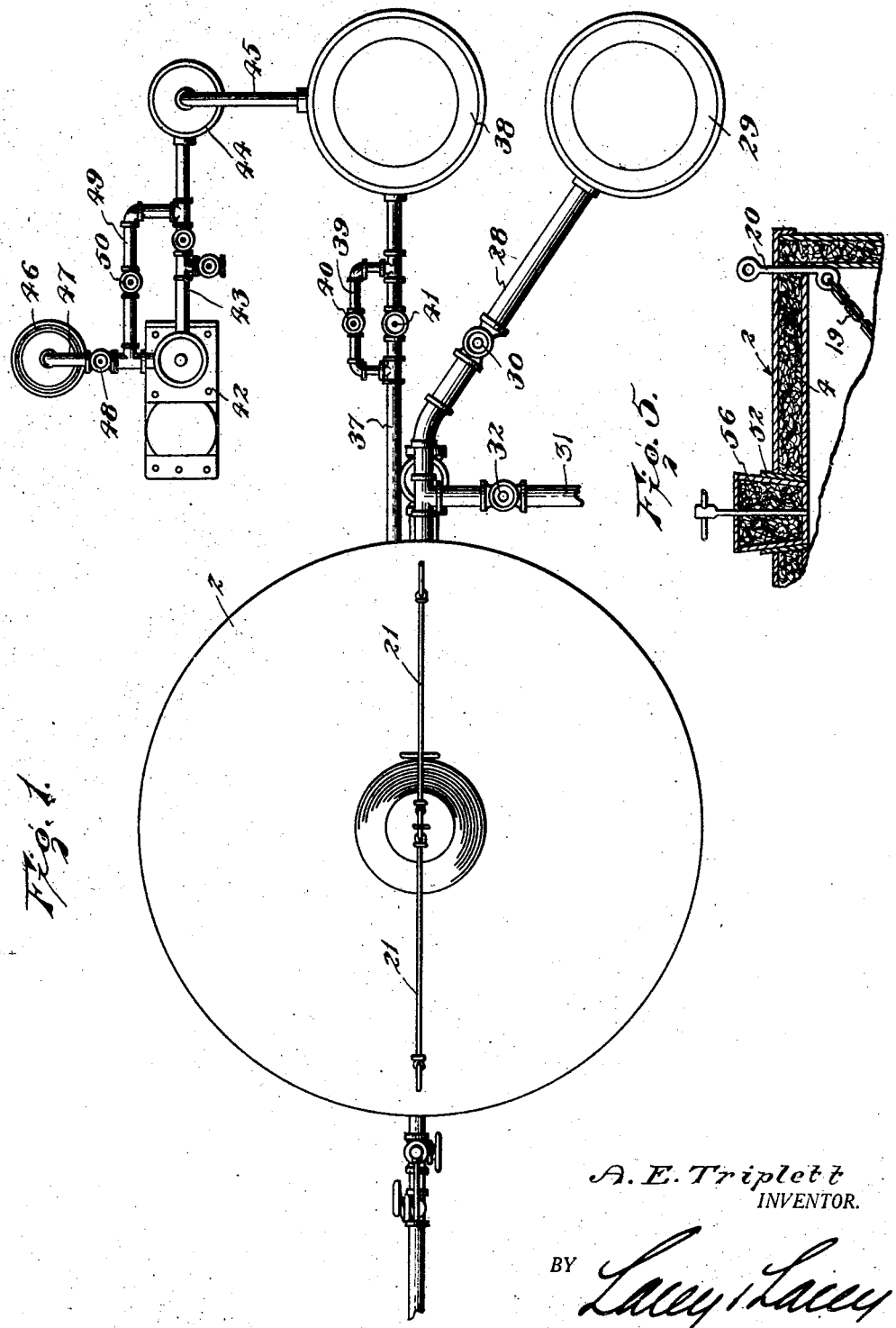
Figure 1 is a top plan view.

Referring to the drawings, A designates a casing which consists of a base section 1, top section 2, and an intermediate section 3, all of which are of sheet steel, double wall construction in order that mineral wool or other suitable insulating material 4 may be used. By forming the casing in sections the same can be conveniently assembled or disassembled. The base section has mounted therein upper and lower grates 5 and 6 respectively. Mounted upon the grate 6 are blocks 7 of soapstone or other heat retaining material and upon which rests an insulating member 8 of any suitable design, which serves to diffuse the heat and prevent concentration upon the bottom of the vessel to be hereinafter described.

Mounted below the grate 6 is a gas burner 9 which rests upon a plate 10 and in which are formed perforations 11 in order that air from the nozzle 12 will pass therethrough to promote proper combustion. The nozzle is supported in a plate 13 spaced from the plate 10. Air entering the space 13' below the plate 10 will be uniformly distributed through the perforations 11.

Mounted in the casing A is a vessel 14 which constitutes the oven proper of the apparatus. An annular skirt 15 depends from the bottom of the vessel and rests upon the base 5, said skirt having perforations 15' formed therein to permit the heat generated by the burner to reach the bottom of the vessel and this skirt may form an integral part of the vessel or may be formed separate therefrom, as desired.

The vessel is provided with a removable cover 16 which is held in a closed position by clamping members 17 of a conventional design. The cover has an eye bolt 18 fixed thereto to which are secured one of the terminals of the chain sections 19, the other terminals thereof being secured to the shanks 20 carried by the top section 2. Cable sections 21 are secured to the shanks 20 at one of their ends and at their other ends to a ring 22 to which ring is secured a cable 22' which is secured to a counterbalance (not shown) in order that the top section 2 may be conveniently lifted when it is desired to remove the cover 16. The chain sections 19 are of such length that the cover 16 will be suspended below the top section 2 when it is elevated in order that the cover can be removed or replaced when the top section is elevated.

Figure 2:
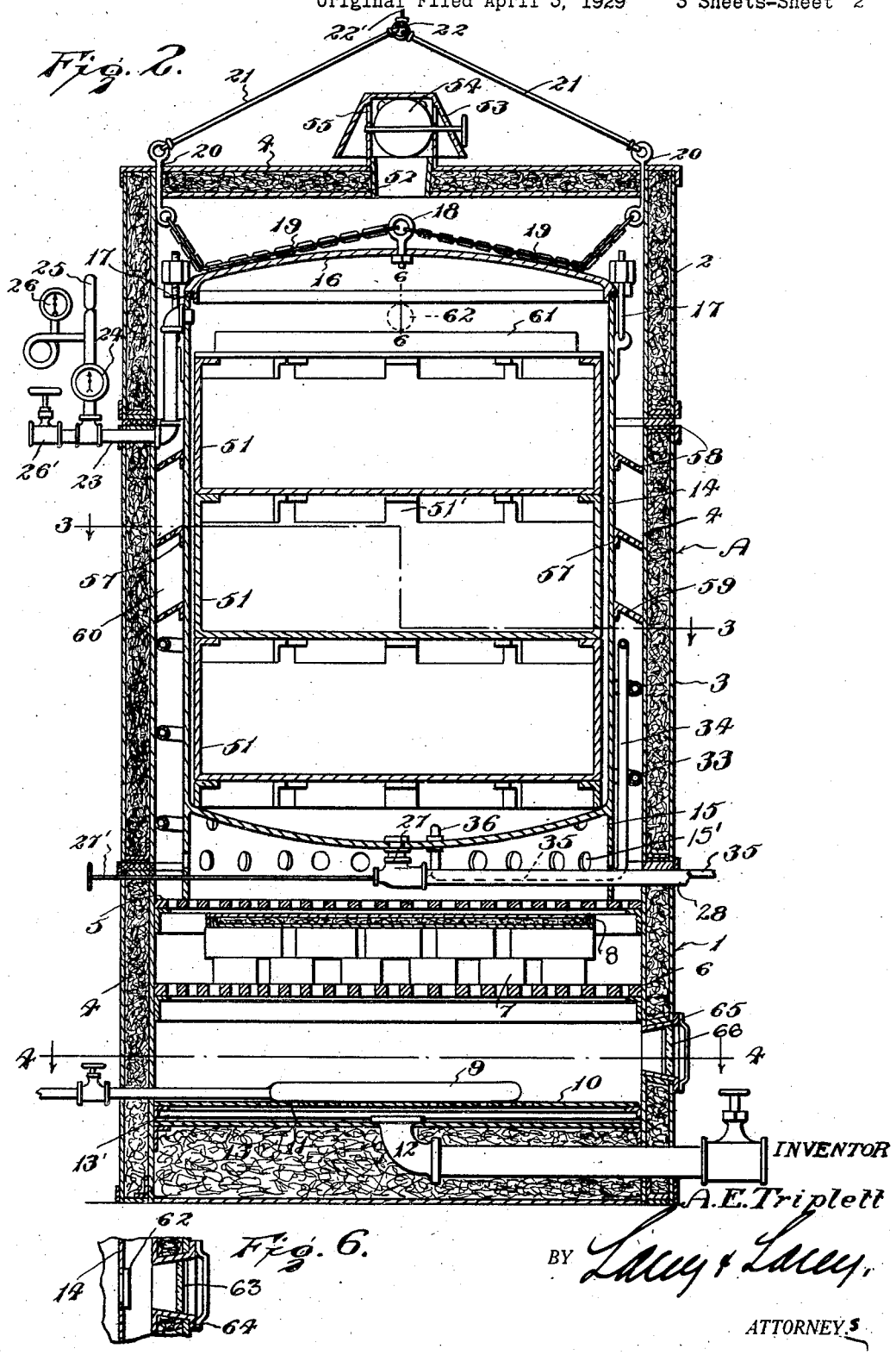
Figure 2 is a vertical sectional view.
Figure 3:
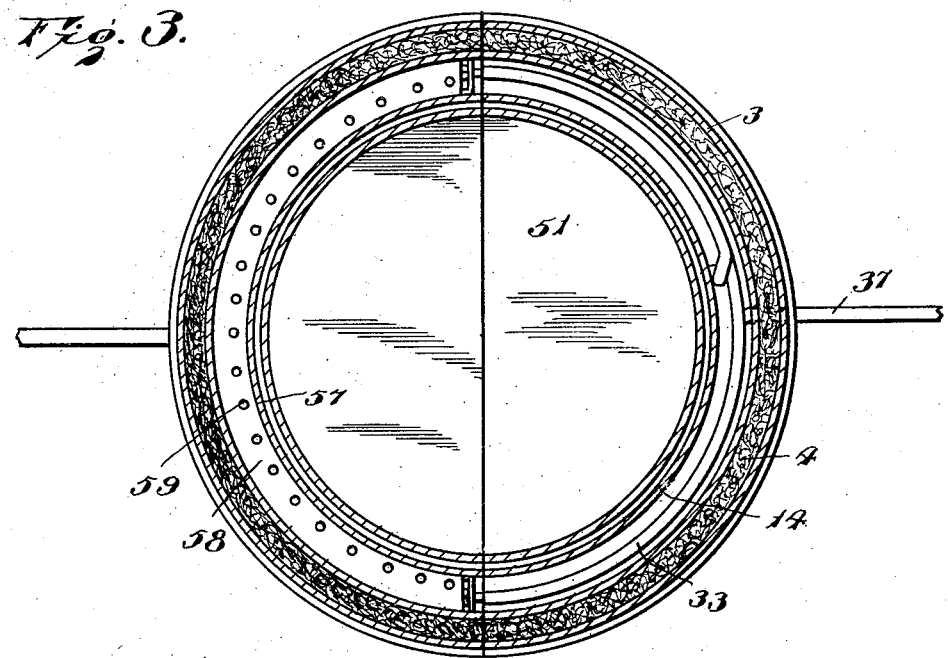
Figure 3 is a sectional view on the line 3—3 of Figure 2.
Figure 4:
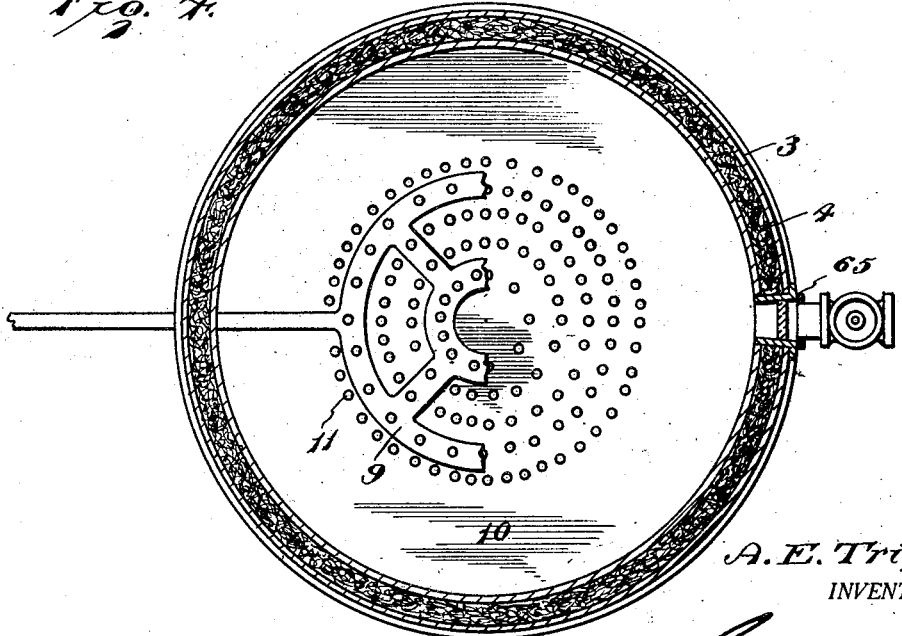
Figure 4 is a sectional view on the line 4—4 of Figure 2.

Leading from the vessel 14 is a pipe assembly 23 having associated therewith a temperature gauge 24, pop or flow valve 25, and pressure gauge 26. The valve 25 will automatically regulate the flow and pressure of the heated air and gases from the vessel. A manually controlled valve 26′ is connected in the assembly 23 and operates in connection with the valve 25 to regulate the degree of ventilation. The pipe assembly opens into the upper end of the vessel, as more clearly shown in Figure 2 of the drawings.

A valve 27 opens into the bottom of the vessel 14, hot water for washing the vessel being furnished thereto through a pipe 28 which leads from a hot water storage tank 29, said pipe being provided with a regulating valve 30 and a drain pipe 31 equipped with a valve 32. Encircling the vessel is a pipe coil 33 to preheat the air used for ventilating the vessel as will be later described before it enters the vessel so that the temperature therein will not be lowered, the uppermost helix thereof terminating in a vertical branch 34 which, in turn, terminates in a horizontal branch 35, the terminal of which opens into the vessel at its bottom and is provided with a check valve 36.

The lowermost helix of the pipe coil terminates in a pipe 37 which extends through the base section 1 and leads to a compressed air storage tank 38, there being a bypass pipe 39 connected to the pipe 37 and having a valve 40 associated therewith. The pipe 37 is provided with a valve 41 which is located between the branches of the bypass pipe.

An air compressor 42 of suitable design is employed and has leading therefrom a pipe 43 which communicates with an air filter 44 of suitable construction, said filter being connected to the tank 38 by a pipe 45.

A smudge pot 46 is connected to the compressor 42 by a pipe 47 having a valve 48 and connecting the pipe 47 and pipe 43 is a vacuum bypass pipe 49 having a valve 50 therein. Hickory wood or other suitable wood is burned in this pot and the smoke thereof can be controlled at will. This smoke is conducted to the filter 44 and from thence, with the compressed air, into the vessel 14.

The vessel 14 has mounted therein a plurality of superposed food trays or pans 51 which may be racked as shown so that they may be subjected to radiant heat from the walls of the vessel 14. The trays are provided with members 51′ in order that they will be maintained in spaced relation.

The top section 2 is provided with a centrally located thimble 52 which opens into the casing and removably connected with said thimble is a cowl 53 in which is mounted a damper plate 54, said cowl having openings 55 therein to permit the escape of heat from the casing when desired.

Since the cowl is removable, a plug 56 can be placed in the thimble, as shown in Figure 5 of the drawings, in order to retain the heat in the casing when the gas flame is extinguished.

A plurality of vertically spaced split bands 57 are clamped around the vessel 14 above the coil 33 and have carried thereby baffle flanges 58 in which are formed perforations 59. These baffle flanges are of such size that the outer ends thereof will bear against the interior wall of the section 3 and will obviously retard the passage of heat from the burner 9 upwardly in the annular space 60 defined between the casing and vessel. Removably mounted upon the uppermost pan 51 is a pad 61 formed of absorbent material, preferably consisting of burnt fire clay and cement, and is employed for absorbing injurious volatile oils thrown off during the cooking process. The vessel 14 is provided with a temperature gauge 62 at its upper end as shown in Figure 6 which coincides with a lens 63 carried by the frame 64 removably mounted in the section 2. A similar frame 65 is removably mounted in the base section 1 and carries a lens 66 in order that the condition of the burner flame can be observed. Obviously, upon removing both the frames 64 and 65, the apparatus can be more quickly cooled after the flame is extinguished when the cooking operation is finished. A thermostat of suitable design may be used for regulating the flow of gas to the burner 9.

When it is desired to cook cured meats, such as hams, the same are placed in the pans 51 and may be saturated with or contained in proper seasoning fluid. The air flowing into the coil 35 will be heated and then flows into the vessel 14 in measured quantities at a predetermined pressure, thence out through the valve 25, taking with it all the impurities released by the heat and oxygen, and, when desired, smoke is mixed with the air as it flows into the filter through the pipe 49. The mixture of smoke and air can be conveniently automatically controlled by the valves 40, 41 and 25.

When it is desired to cool the apparatus quickly, the frames 64 and 65 and the plug 56 are removed in order that a draft will be created through the apparatus.

It will, of course, be understood that the casing 1 has its wall formed from suitable sheet metal in order that the insulating material can be conveniently packed therein.

The valve 27 has an actuating rod 27′ connected therewith and upon closing this valve, hot water can be used for flushing juices from the pipe 28. When this is done the valve 32 is opened to permit discharge of the flush water through the pipe 31. Obviously, the valve 50 in the vacuum bypass 49 can be opened to draw air from the vessel so that juices can be boiled out of the meat quickly. The valves are then closed so that the juices are cooked under flowing filtered air and pressure at a predetermined degree of heat. In this manner beef extract can be processed.

What is claimed is:

1. A method of cooking food which consists in placing the food to be cooked in trays, racked one above the other, within a closed cooking vessel, subjecting the exterior of the vessel to heat so as to bring the interior of the vessel to a predetermined temperature whereby the cooking of the food takes place due to the heat applied exteriorly to the closed vessel, and simultaneously subjecting the food substance during the cooking period to a predetermined pressure of preheated air having a continuous flow into and out of the closed vessel so as to carry away the gases and vapor generated during the cooking operation and maintain within the vessel a uniform temperature, pressure, and continuous supply of fresh air free from fuel gases.

2. A method of cooking food which comprises maintaining the food to be cooked in an airtight container, applying heat to said container sufficient to effect the cooking of said food, and simultaneously therewith and continuously during the cooking operation forcing through said container a current of preheated air to thoroughly ventilate said container and carry away therefrom the gases and vapors generated during said cooking operation, the pressure and temperature within said container being maintained at a uniform predetermined value during said cooking operation.

3. In that method of cooking food in airtight containers in which the heat necessary to effect the cooking is applied externally of said container, and in which the cooking of said food takes place by virtue of the heat radiated from the walls of said container, that step which consists in maintaining a uniform, predetermined pressure of air within said container by continuously forcing therethrough a current of preheated air whereby the interior of the container is continuously ventilated and purged of the vapors and gases generated during the cooking operation.

4. In that method of cooking food in which the food is placed in an air tight container, the food being cooked by radiant heat, that step which consists in forcing through said container a continuous uniform stream of preheated filtered air to purge the atmosphere within said container, a predetermined pressure due to said stream of air being maintained within said container throughout the cooking operation.

5. A method of cooking food which comprises placing said food in a container closed to the access of the atmosphere, applying heat externally of said container sufficient to effect the cooking of said food, and maintaining a uniform predetermined air pressure within said container throughout the cooking operation, said air pressure being maintained by continuously forcing through said container a stream of preheated filtered air, whereby thorough ventilation of and the elimination from said container of the gases and vapors generated during the cooking operation takes place.

In testimony whereof I affix my signature.

ARMSTEAD E. TRIPLETT. [L. S.]